(12) United States Patent
West et al.

(10) Patent No.: US 7,048,089 B2
(45) Date of Patent: May 23, 2006

(54) METHODS AND APPARATUS FOR USE IN DETECTING SEISMIC WAVES IN A BOREHOLE

(75) Inventors: Phillip B. West, Idaho Falls, ID (US); James R. Fincke, Los Alamos, NM (US); Teddy R. Reed, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 356 days.

(21) Appl. No.: 10/431,872

(22) Filed: May 7, 2003

(65) Prior Publication Data

US 2004/0223410 A1    Nov. 11, 2004

(51) Int. Cl.
*G01V 1/40* (2006.01)
*G01V 1/09* (2006.01)
*G01V 1/16* (2006.01)

(52) U.S. Cl. ............... 181/105; 181/112; 181/122; 367/35

(58) Field of Classification Search ........... 181/105, 181/122, 112; 367/35
See application file for complete search history.

(56) References Cited

U.S. PATENT DOCUMENTS

| | | | | |
|---|---|---|---|---|
| 2,699,001 A | * | 1/1955 | McMahan ............... 33/544.3 |
| 2,776,564 A | * | 1/1957 | Montgomery et al. ... 73/152.01 |
| 2,846,662 A | * | 8/1958 | Sparks .................... 367/58 |
| 3,405,772 A | * | 10/1968 | Wisenbaker et al. ........ 175/77 |
| 3,978,939 A | * | 9/1976 | Trouiller ................ 181/104 |
| 4,020,452 A | * | 4/1977 | Trouiller et al. .......... 181/102 |
| 4,192,380 A | * | 3/1980 | Smith .................. 166/254.2 |
| 4,243,099 A | * | 1/1981 | Rodgers, Jr. ............. 166/66.4 |
| 4,336,841 A | | 6/1982 | Garner, Jr. |
| 4,676,310 A | * | 6/1987 | Scherbatskoy et al. .. 340/853.4 |
| 4,686,653 A | * | 8/1987 | Staron et al. ........... 340/856.2 |
| 4,715,469 A | | 12/1987 | Yasuda et al. |
| 4,811,814 A | * | 3/1989 | Staron et al. ............ 181/108 |
| 4,823,125 A | * | 4/1989 | Rorden et al. .......... 340/853.1 |
| 4,930,595 A | * | 6/1990 | Hayward et al. ......... 181/104 |
| 4,953,136 A | | 8/1990 | Kamata et al. |
| 4,987,969 A | * | 1/1991 | Boyle et al. ............ 181/102 |
| 5,044,460 A | | 9/1991 | Kamata et al. |
| 5,146,050 A | | 9/1992 | Strozeski et al. |
| 5,184,676 A | * | 2/1993 | Graham et al. .......... 166/66.4 |
| 5,200,581 A | * | 4/1993 | Boyle et al. ............ 181/102 |
| 5,259,452 A | | 11/1993 | Wittrisch |
| 5,275,239 A | | 1/1994 | Obrejanu |
| 5,318,129 A | | 6/1994 | Wittrisch |
| 5,343,001 A | | 8/1994 | Cowles et al. |
| 5,521,337 A | * | 5/1996 | Chen et al. ............. 181/102 |
| 5,594,176 A | * | 1/1997 | Kiefer .................... 73/623 |

(Continued)

*Primary Examiner*—Edgardo San Martin
(74) *Attorney, Agent, or Firm*—TraskBritt, PC

(57) ABSTRACT

The invention provides methods and apparatus for detecting seismic waves propagating through a subterranean formation surrounding a borehole. In a first embodiment, a sensor module uses the rotation of bogey wheels to extend and retract a sensor package for selective contact and magnetic coupling to casing lining the borehole. In a second embodiment, a sensor module is magnetically coupled to the casing wall during its travel and dragged therealong while maintaining contact therewith. In a third embodiment, a sensor module is interfaced with the borehole environment to detect seismic waves using coupling through liquid in the borehole. Two or more of the above embodiments may be combined within a single sensor array to provide a resulting seismic survey combining the optimum of the outputs of each embodiment into a single data set.

14 Claims, 12 Drawing Sheets

U.S. PATENT DOCUMENTS

| | | |
|---|---|---|
| 5,728,978 A | 3/1998 | Roberts et al. |
| RE35,790 E | 5/1998 | Pustanyk et al. |
| 5,798,488 A | 8/1998 | Beresford et al. |
| 5,864,099 A | 1/1999 | Wittrisch et al. |
| 6,006,855 A | 12/1999 | Howlett |
| 6,062,309 A | 5/2000 | Gosse |
| 6,088,294 A | 7/2000 | Leggett, III et al. |
| 6,119,782 A * | 9/2000 | Flores et al. ............... 166/382 |
| 6,135,234 A | 10/2000 | Harris et al. |
| 6,179,084 B1 | 1/2001 | Yamamoto et al. |
| 6,181,642 B1 | 1/2001 | Coates et al. |
| 6,480,118 B1 | 11/2002 | Rao |
| 6,568,501 B1 * | 5/2003 | Paulsson ................. 181/102 |
| 6,629,568 B1 * | 10/2003 | Post et al. ................ 166/382 |
| 6,752,216 B1 * | 6/2004 | Coon ....................... 166/387 |
| 2004/0011533 A1 * | 1/2004 | Lawrence et al. .......... 166/382 |

\* cited by examiner

METHODS AND APPARATUS FOR USE IN DETECTING SEISMIC WAVES IN A BOREHOLE

GOVERNMENT RIGHTS

The United States Government has certain rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates generally to seismic surveying of subterranean geological formations. More particularly, the present invention relates to improved seismic sensors for monitoring seismic waves at a location within a liquid-filled borehole, and methods for their use.

2. State of the Art

Seismic surveying is used, by way of example, to examine subterranean geological formations for the potential presence of reserves of hydrocarbons such as petroleum, natural gas and combinations thereof as well as the extent or volume of such reserves. Seismic waves, also termed acoustic waves, are emitted from a seismic energy source to penetrate through layers of rock and earth, and under certain conditions are reflected and refracted by variations in the composition of the subterranean formations in the path of the waves. Seismic sensors configured as motion sensors in the form of geophones or accelerometers or pressure sensors in the form of hydrophones receive the reflected and refracted waves and convert them into corresponding electrical signals, which are then analyzed for the presence and extent of formations containing oil and gas deposits.

An increasingly common technique for subterranean exploration is known as borehole seismic surveying, wherein one or more seismic sensors are placed below the earth's surface in the liquid-filled borehole of a well. The seismic energy source may be located above ground, or may also be placed in a borehole to emit seismic waves within close proximity to the area of interest. By recording the seismic waves at various depths below the surface, a profile is acquired that provides more detailed information about the surrounding area than may be acquired using surface-based seismic sensors. These higher resolution views of subterranean formations can thus be examined for the presence of hydrocarbon reserves that might otherwise remain hidden.

In order to reduce the time required for data acquisition, an array of seismic sensor modules is deployed in the borehole to take simultaneous readings at different locations along its length. The sensor modules, typically in the form of sondes containing geophones, are lowered into the borehole on an elongated structure including a conductive cable such as a wireline, tubing string or other suitable structure. The geophones are configured for measuring the seismic waves in three directions or axes, to give a reading for each of the orthogonal components of the waves. For optimum sensing by the geophones, it is necessary that there be a good interface between the sondes and the subterranean formation volume surrounding the borehole to ensure effective transmission of seismic energy. In the prior art this has often been accomplished by using extendable mechanical arms that urge the sondes into firm contact with the borehole wall, and provide an improved mechanical coupling for conducting waves to the geophones. In boreholes that are lined with metallic casings, magnetic means have also been used in an attempt to couple sondes to the borehole wall. All of the foregoing types of systems are controlled from above the surface to deploy the interface structures for the geophones, and involve complicated mechanisms for extending and retracting arms or orienting and activating magnets. Limitations on transmitting electric and hydraulic power to significant depths are another significant concern. The prior art approaches result in increased equipment cost and enhanced possibility of a malfunction causing the sondes to become stuck within the borehole and requiring an expensive retrieval, or "fishing," operation. Further, wave components traveling perpendicular to the borehole, versus wave components traveling up and down the borehole liquid column, are subject to different influences on their propagation. Interfacing all of the sondes in the same wall-coupling manner may not improve geophone readings for all three x, y and z sensor directions.

What is needed, therefore, are robust and uncomplicated methods and apparatus that achieve an improved interface between seismic waves and sensor modules within a borehole to provide high-resolution seismic survey data, while overcoming the problems associated with the prior art.

BRIEF SUMMARY OF THE INVENTION

In accordance with the present invention, improved seismic sensors and methods for coupling them within a borehole are disclosed. Embodiments of the present invention are directed to sensor modules having geophones for sensing of seismic waves. The sensor modules are lowered into a borehole as part of a sensor array, and monitor signals emitted from a seismic energy source located at the earth's surface or similarly contained within a borehole. The sensor modules are interfaced with the surrounding environment in such a way that complex and unreliable coupling mechanisms are not required, while still enabling optimized geophone sensing.

In a first exemplary embodiment of the invention, a sensor module includes a sensor package, or sonde, that is magnetically coupled to the wall of a borehole having a metallic casing. During deployment, the sensor module uses a self-contained device to automatically extend and retract the sensor package. Bogey wheels on the module ride along the borehole casing and operate a mechanism that retracts the sensor package away from the casing during sensor module travel. When the sensor module is brought to a halt at a desired sensing location, the bogey wheels no longer operate the retraction mechanism, and the sensor package extends for magnetic coupling to the metallic casing. Upon renewed longitudinal motion through the borehole, the bogey wheels and associated retraction mechanism detach the sensor package from its magnetic coupling. The device thus provides a good interface with the subterranean environment surrounding the borehole, while eliminating complicated parts and lengthy connections to above surface actuation controls. In addition, because movement of the sensor module automatically retracts the sensor package, the risk of sticking the module within the borehole due to a malfunction is significantly reduced.

In a second exemplary embodiment of the invention, a sensor module is interfaced by magnetic coupling to a metallic borehole casing as described above with respect to the first exemplary embodiment, but without the requirement for any mechanical coupling devices. The sensor module comprises a sonde having a plurality of permanent magnets placed around its periphery. The magnets are attached so as to form protrusions extending from the sides of the sonde. Each magnet is oriented such that its protrusion presents a magnetic pole opposite to the pole presented by the protrusion of an adjacent magnet. This creates magnetic field lines, which pass from one protrusion to another along the periphery of the sonde. The sensor module is simply dragged along the casing wall of the borehole during deployment, with some of the protrusions in magnetic contact with the borehole casing. This approach has the added advantage of scraping away surface deposits that may exist on the casing, which will improve the magnetic coupling.

In a third exemplary embodiment of the invention, a sensor module is designed to efficiently interface with the surrounding environment without requiring direct coupling to a borehole wall or casing. Rather, the module is formed as a container or sonde having a mass-to-volume ratio that gives it an average density substantially equal to that of the borehole liquid. This equal density, and the nearly incompressible nature of a liquid, allows the sensor module to precisely match the displacement of borehole liquid due to seismic wave disturbance. This creates, in effect, a liquid coupling wherein the motion of the sensor module can be monitored to exactly track the seismic waves. The simple and lightweight construction of this embodiment is highly cost effective and reduces the need for complicated supporting architecture, facilitating its deployment on wireline. This type of sensor module is also well adapted for attachment to drill pipe or coiled tubing used to perform borehole drilling or downhole maintenance and remediation functions, and may be particularly suitable for use in seismic while drilling operations.

In yet another exemplary embodiment of the present invention, a sensor array having a number of sensor modules of the various above-described embodiments is provided for deployment within a borehole. Geophones within the sensor modules measure seismic waves emitted from a seismic energy source, and provide an output reading for each of the orthogonal components of the waves. The wave components most effectively measured by each of the sensor module embodiments are then used to generate a seismic survey, while the other components are filtered out. This optimizes the survey data by combining the advantages of each sensing technique into a single result.

Other and further features and advantages will be apparent from the following detailed description of the invention taken in conjunction with the accompanying drawings. The following examples are provided for purposes of illustration only, and are not intended to be limiting. It will be understood by one of ordinary skill in the art that numerous combinations and modifications are possible for the embodiments presented herein.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Although the subsequent examples will be discussed in terms of deployment in a well used for petroleum or gas exploration and production, it should be understood that the present invention would also work well for seismic surveying applications not related to these fields. Any technology that uses sensors deployed within a borehole to monitor seismic waves may benefit from the present invention.

Figure 1:
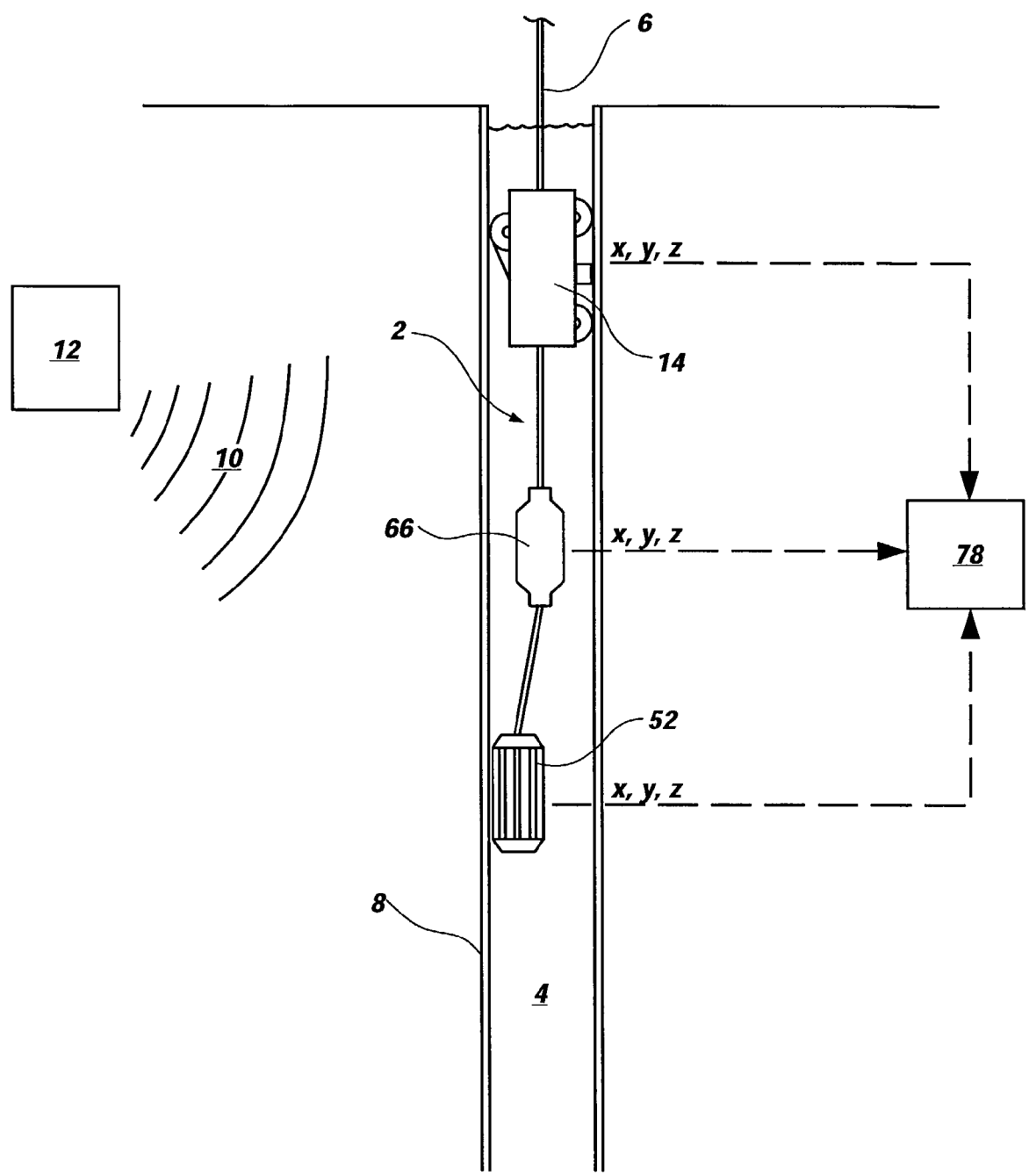
FIG. 1 is a side view of a well borehole having a sensor array deployed therein in accordance with the present invention.

Referring initially to FIG. 1, three different sensor module embodiments 14, 52 and 66 of the invention are illustrated in a sensor array 2. Sensor array 2 is deployed in a liquid or slurry filled well borehole 4 for seismic surveying of the subterranean formation volume proximate the well. Sensor array 2 is lowered into the borehole 4 on an elongated structure depicted as wireline 6, however, other suitable structure such as a tubing string may be used. The liquid or slurry may comprise, for example, water or a water and hydrocarbon based drilling fluid, or "mud." In the case of petroleum exploration, the interior of borehole 4 will usually be surrounded by a metallic, typically steel, casing 8 which has been floated into the borehole 4 subsequent to the drilling thereof and then cemented in place, as known to those of ordinary skill in the art. Seismic waves 10 generated by seismic energy source 12 are passed through the subterranean formations surrounding borehole 4, and sensor array 2 monitors these waves from within borehole 4 after reflection from and refraction by these formations to provide geological information.

Figure 2:
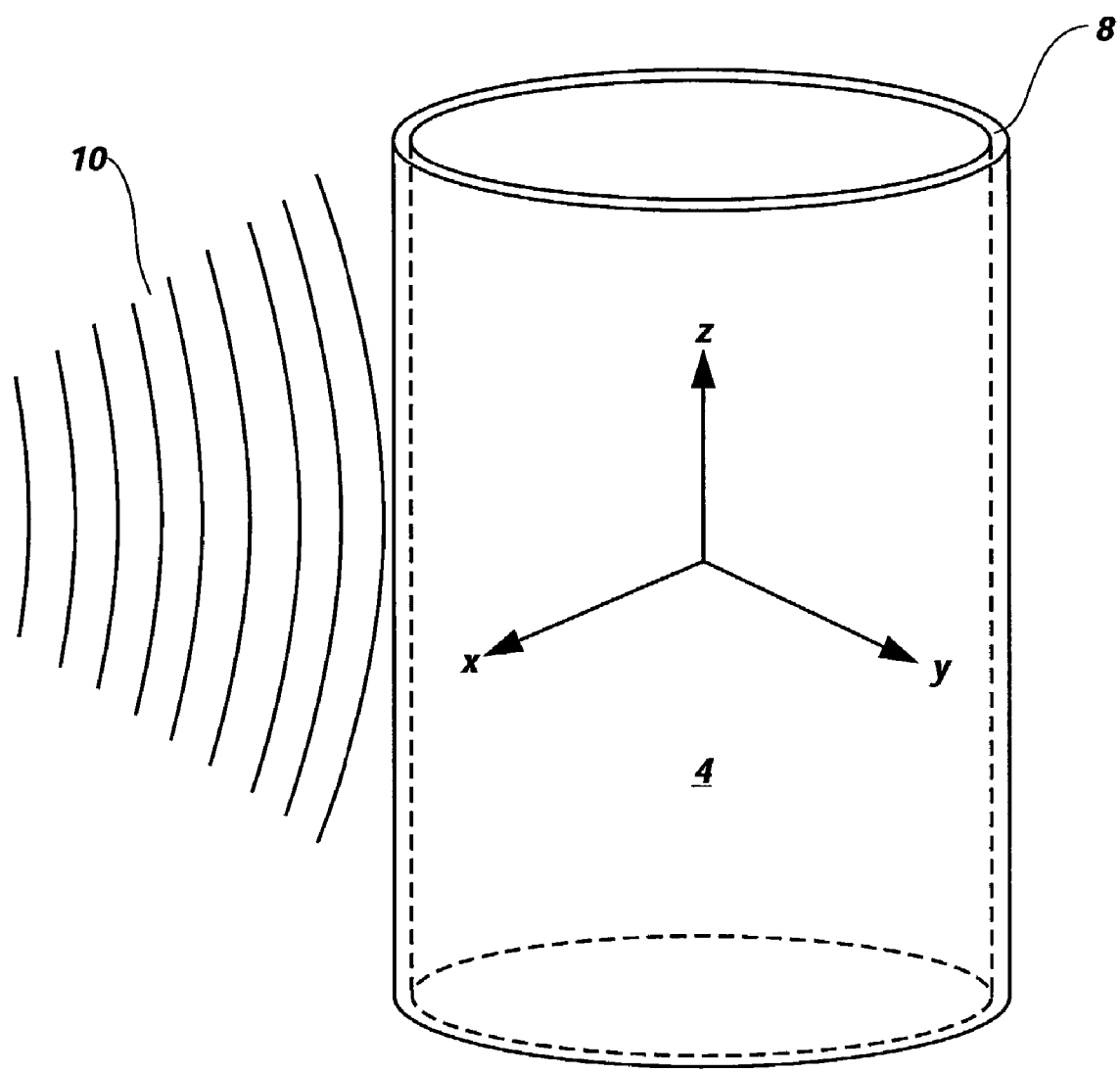
FIG. 2 is a perspective view of a well borehole indicating the x, y and z directions for orthogonal components of seismic waves passing through the borehole and surrounding subterranean area.

Turning to FIG. 2, the seismic waves may be considered as being comprised of orthogonal components traveling in the x, y and z directions. The sensor modules of array 2 carry geophone type sensors that are configured and oriented for measuring the seismic waves in these three directions, or axes, to give a reading for each of the orthogonal components of the waves. The geophones operate by measuring displacement between a stationary first part and a second part that is allowed to move along a defined axis in response to the seismic waves transmitted thereto as vibrations. This method of operation requires a good interface between the geophones and the final transmission medium for the seismic waves acting upon the geophones in order to effectively receive the vibrations.

Figure 3A:
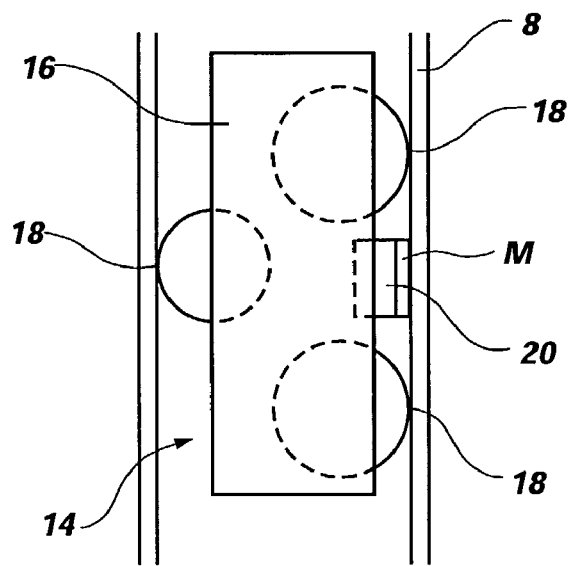
FIGS. 3A and 3B show schematic views of a magnetic sensor module of the present invention having a self-contained device to automatically extend and retract a sensor package.
Figure 3B:
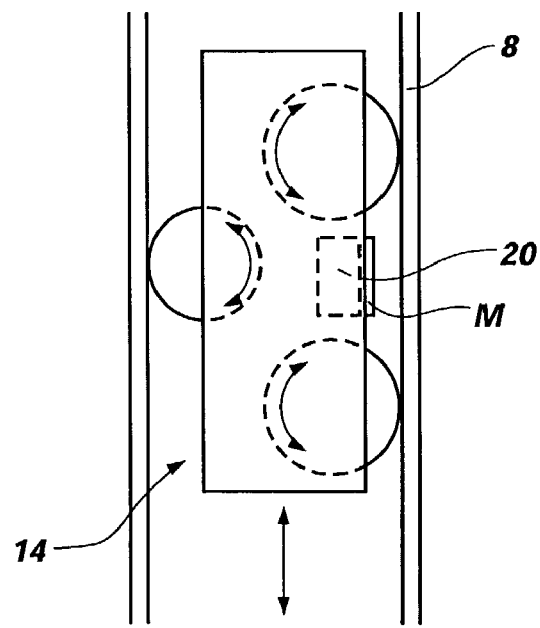

FIGS. 3A and 3B schematically illustrate a first sensor module embodiment 14 of the present invention having a self-contained device to automatically extend and retract a sensor package. Sensor module 14 includes a housing 16, bogey wheels 18 and sensor package or sonde 20. At least one of the bogey wheels 18 is biased to swing away from housing 16 so as to force the bogey wheels 18 on both sides of housing 16 into firm contact with borehole casing 8. FIG. 3A shows that when the sensor module 14 is stationary within borehole 4, sensor package 20 extends out for magnetic coupling to borehole casing 8 via one or more permanent magnets M carried by the sensor package. When sensor module 14 is placed in motion, for example during initial deployment or repositioning within borehole 4, bogey wheels 18 are rotated due to their contact with borehole casing 8. The rotation operates a mechanism attached to bogey wheels 18 that retracts sensor package 20 away from borehole casing 8, as depicted in FIG. 3B. Sensor package 20 is held in the retracted position during travel of sensor module 14. After movement has ceased, bogey wheels 18 no longer rotate to operate the retracting mechanism, and sensor package returns to the extended position for magnetic coupling to borehole casing 8.

Figure 4A:
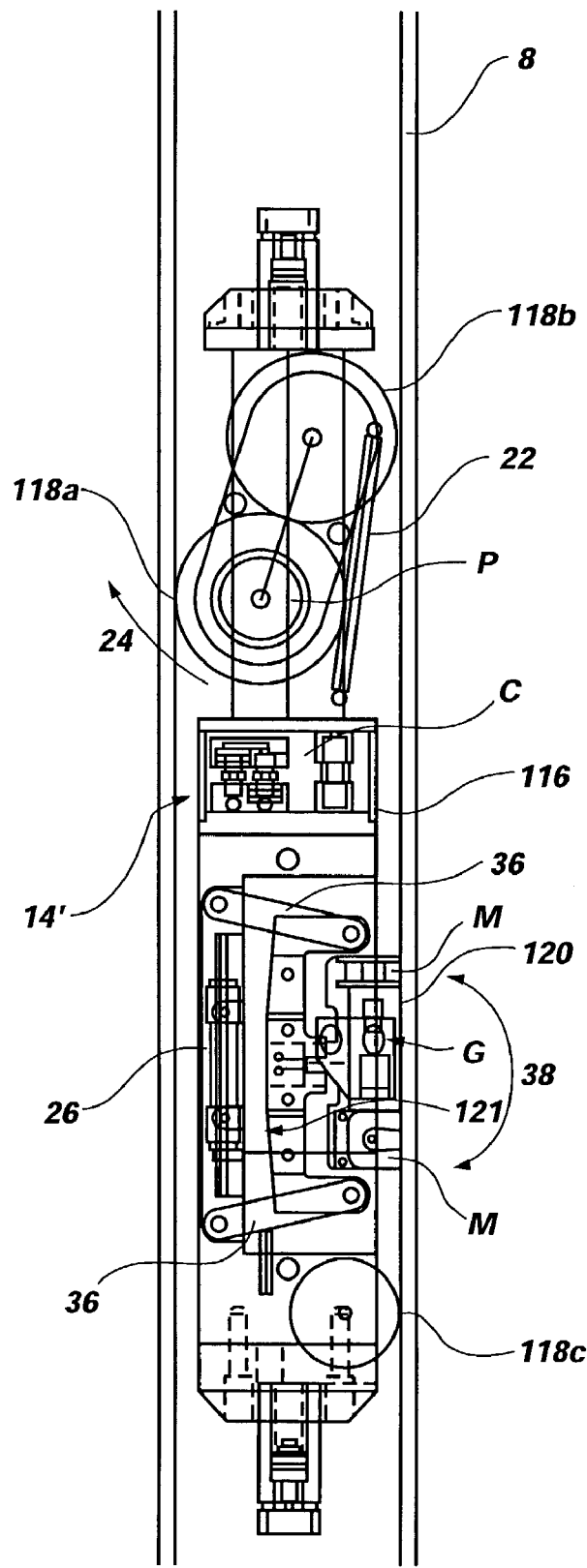
FIGS. 4A and 4B show schematic views of one alternative mechanism for retracting the sensor package of the magnetic sensor module depicted in FIGS. 3A and 3B.

FIG. 4A shows one implementation of the first exemplary embodiment, characterized as sensor module 14'. Sensor module 14' employs a hydraulic pump and cylinder arrangement as the mechanism for retracting sensor package 120 carrying magnets M and one or more geophones G. Bogey wheel 118a is biased by spring 22 to swing outwardly toward the wall of casing 8 in the direction of arrow 24 and press against casing 8. Bogey wheels 118b and 118c are pressed against the side of borehole casing 8 opposite bogey wheel 118a. A hydraulic pump P for driving pistons within a cylinder 26 through control manifold C is incorporated with bogey wheel 118a. The hydraulic pump P, for example a gear pump, is actuated by rotation of the wheels. Other types of pumps using drives configured for translating the wheel motion into pumping force would also be suitable. In operation, hydraulic pump P pressurizes a hydraulic fluid responsive to rotation of bogey wheel 118a as sensor module 14' moves longitudinally within casing 8, the hydraulic fluid pressure being communicated to the center of cylinder 26 to move a piston therein (not shown, see FIG. 4B) outwardly in cylinder 26 to tension cable 32 and retract sensor package 120 against an outward spring bias provided by linkages 36.

Figure 4B:
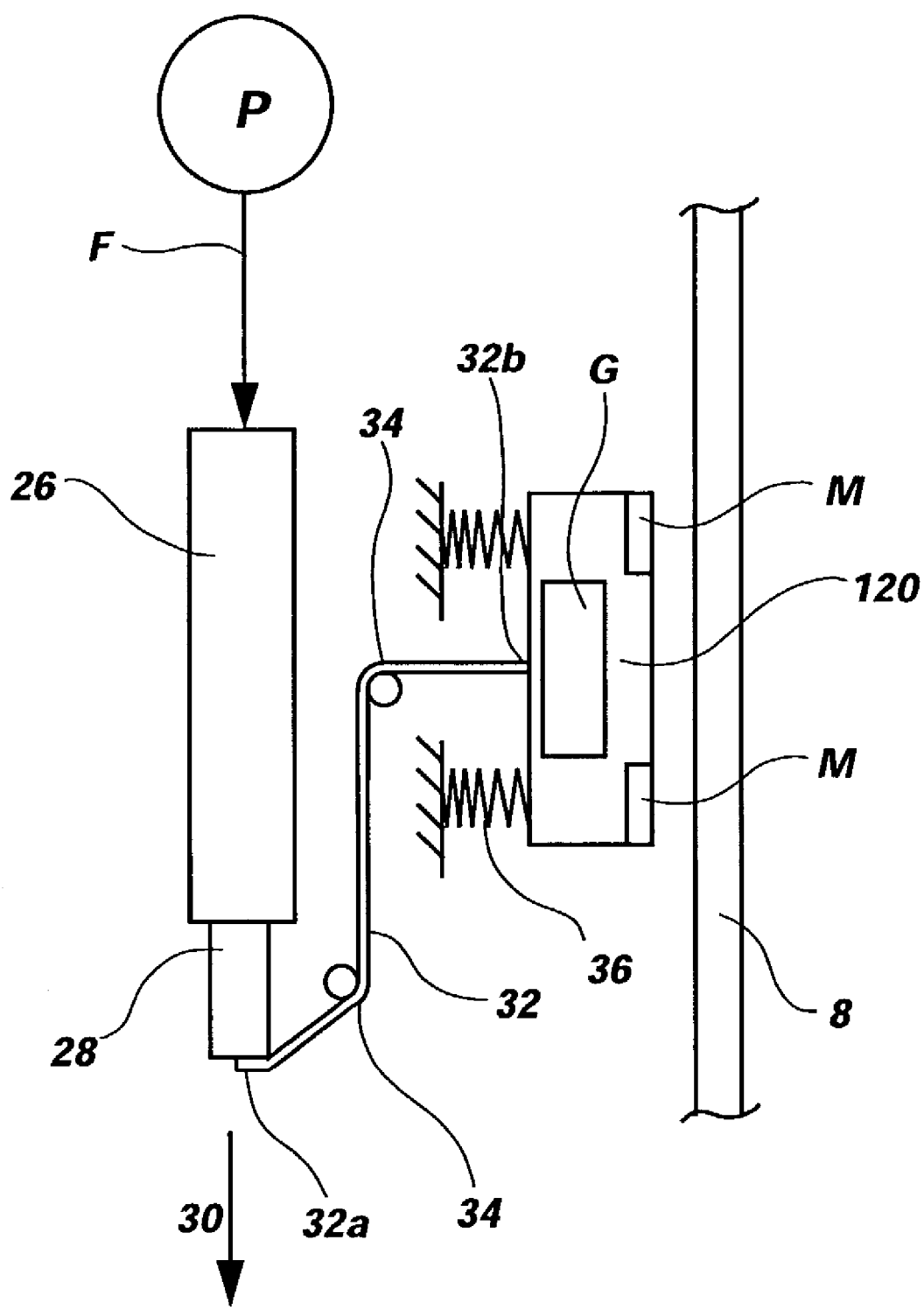

In FIG. 4B, which schematically represents the hydraulic pump and cylinder retracting mechanism, upon movement of sensor module 14', the bogey wheel rotation actuates the hydraulic pump P, which in turn provides pressurized hydraulic fluid to cylinder 26, extending piston 28 in the direction of arrow 30. A cable 32 attached at one end 32a to ram 28 is routed along guide pins or pulleys 34 and attaches at its other end 32b to sensor package 120. As piston 28 extends in the direction of arrow 30, it pulls cable 32, which in turn pulls on sensor package 120 and draws it into a retracted position. During sensor module 14' travel, cylinder 26 will be maintained in a retracted state with piston 28 extended. Once motion is stopped, the hydraulic pump P will no longer pressurize cylinder 26, and sensor package 120, which is biased outwardly by linkages 36 represented schematically as springs in FIG. 4B, will return to the extended position for magnetic coupling by magnets M with the casing 8. Hydraulic fluid is permitted to bleed back into a reservoir in control manifold C for reuse through a check valve which opens when hydraulic pump P is no longer pressurizing the hydraulic fluid.

It is possible that the retracting mechanism could use hydraulically actuated devices other than cylinder 26, such as by extending a bellows or diaphragm with hydraulic pump P to pull cable 32. It is also contemplated that hydraulic pump P may be used to power a drive to wind a cable to retract the sensor package 120 without using a hydraulic cylinder, using a slip clutch to prevent damage to the cable when the sensor package is fully retracted. With any of the above described hydraulically actuated devices, the retracting mechanism should include a balanced hydraulic system capable of compensating for high pressures that may be encountered within the operating environment in order to allow the hydraulic fluid to bleed back into the reservoir in control manifold C. Such balanced hydraulic systems typically involve mechanisms such as bellows or diaphragms for equalizing the pressure between the hydraulic fluid reservoir and the borehole fluid, as previously known in the art.

Returning to FIG. 4A, to aid in overcoming the magnetic attraction of magnets M of sensor package 120 when initially detaching it from borehole casing 8, sensor package 120 is supported in housing 116 with linkages 36. As sensor module 14' begins to move, linkages 36 permit rocking or twisting of sensor package 120 in the direction of arrow 38 about an axis extending perpendicular to the plane of the drawing sheet to break the magnetic coupling with casing 8. This feature reduces the force that would be required for detachment if sensor package 120 were simply pulled back from the face of casing 8 in a direction perpendicular thereto, and thus assists retraction of sensor package 120.

It is also desirable that sensor module 14' include an automatic latching mechanism to maintain the sensor package 120 in a retracted position whenever the hydrostatic pressure within the borehole is low, i.e., near the surface. The latching mechanism could be mechanical, hydraulic, electronic or comprise any other form generally know in the art form providing such a function.

Figure 5:
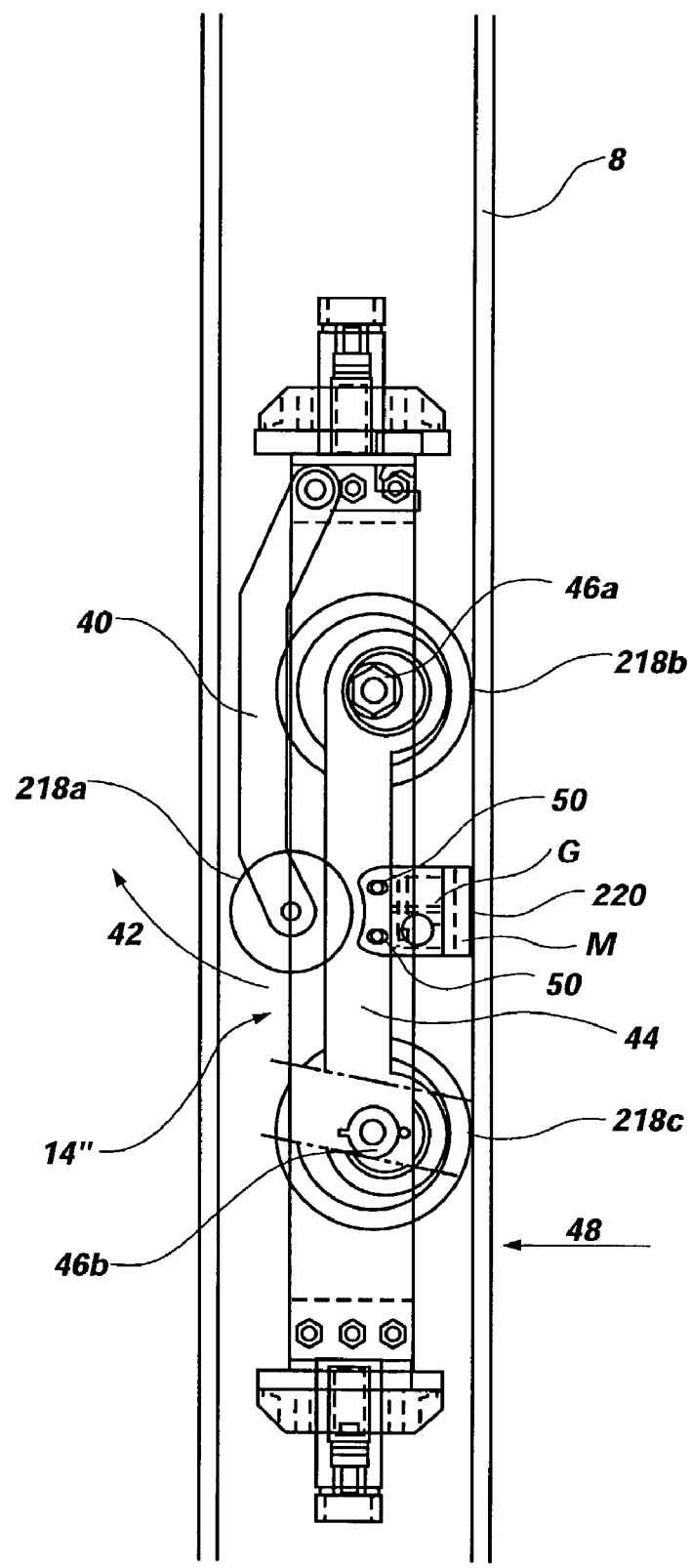
FIG. 5 shows a schematic view of another alternative mechanism for retracting the sensor package of the magnetic sensor module depicted in FIGS. 3A and 3B.

FIG. 5 shows another implementation of the first exemplary embodiment, characterized as sensor module 14". Sensor module 14" uses a slip or friction clutch and cam bar or member arrangement as the mechanism for retracting a sensor package 220. Bogey wheel 218a is mounted on spring biased arm 40 to swing out in the direction of arrow 42 and press against casing 8. Bogey wheels 218b and 218c are pressed against the opposite side of casing 8 due to the spring bias of arm 40 on the opposing side of sensor module 14". Sensor package 220 is mounted to a cam bar 44. Cam bar 44 is eccentrically interfaced with bogey wheels 218b and 218c via respective slip or friction clutches 46a and 46b. When sensor module 14" is stationary within borehole 4, sensor package 220 is in the extended position for magnetic coupling to casing 8, as depicted by FIG. 5. Upon longitudinal movement of sensor module 14", the rotation of bogey wheels 218b and 218c in either direction will force cam bar 44 in the direction of arrow 48, and retract sensor package 220. At a certain point, the force required for further displacement of cam bar 44 in direction 48 will be sufficient to cause friction clutches 46a and 46b to engage. Thereafter, cam bar 44 will be maintained at a constant retracted position during longitudinal travel of sensor module 14" through casing 8. When sensor module 14" is repositioned to a desired location, the longitudinal direction of travel of sensor module 14″ is reversed for a short distance, which may be a matter of inches, sufficient to release friction clutches 46a and 46b and causing cam bar 44 to move back out and extend sensor package 220 for magnetic coupling by magnets M with casing 8.

Sensor package 220 is supported on cam bar 44 by a pair of staggered pins 50. These act to aid in overcoming the magnetic attraction of sensor package 220 when initially detaching it from casing 8 in much the same way as linkage assembly 36 of sensor module 14′. As sensor module 14″ begins to move, one of the pins 50 pulls on extended sensor package 220 before the other, causing one side of sensor package 220 to lift from magnetic coupling with casing 8 before the other side to assist with breaking the magnetic coupling to casing 8.

Figure 6A:
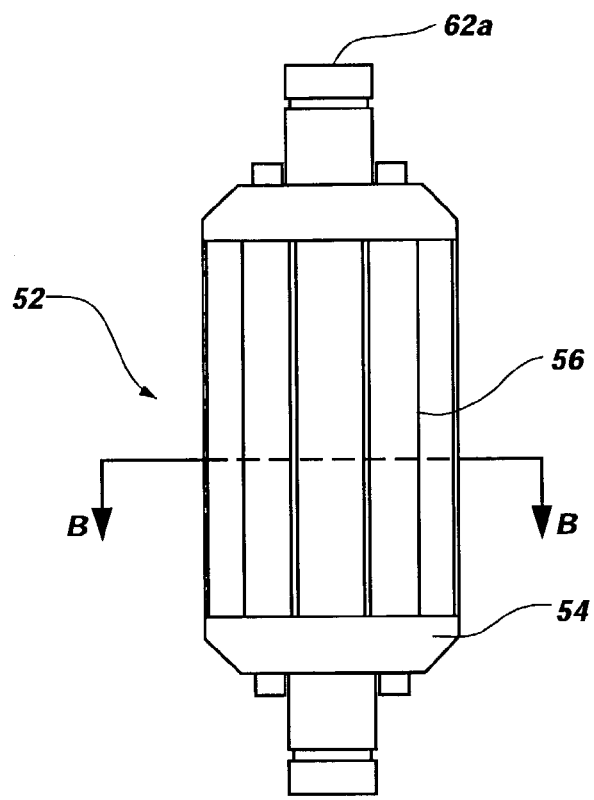
FIG. 6A is a schematic side view of a magnetic sensor module of the present invention comprising a sonde with permanent magnets forming protrusions around its periphery.
Figure 6B:
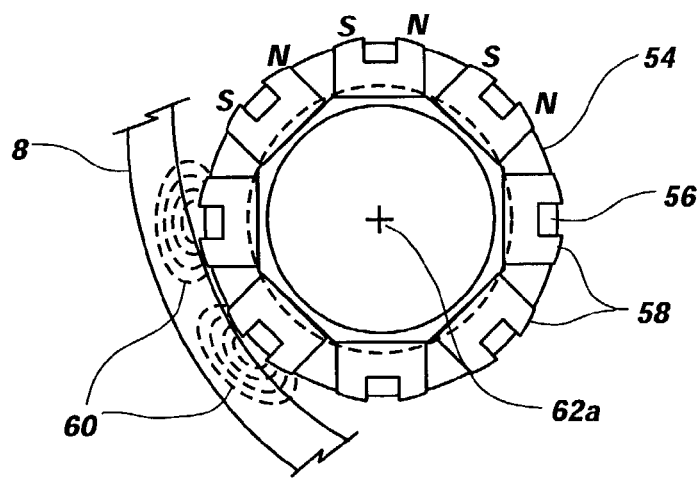
FIG. 6B is a schematic top view of the magnetic sensor module of FIG. 6A taken along section line B.

Turning to FIGS. 6A and 6B, a second exemplary sensor module embodiment 52 of the present invention is illustrated. Sensor module 52 comprises a sonde 54 containing sensors (not shown) and having a plurality of permanent magnets 56 placed around its periphery. The poles of magnets 56 terminate in protrusions 58 that extend outwardly from sonde 54. FIG. 6B, taken along section line B in FIG. 6A, shows permanent magnets 56 of U-shaped cross-section with one pole at each tip. Other magnet shapes are within the scope of the invention, as long as they present a protrusion terminated by a magnetic pole. Each magnet 56 is oriented such that each protrusion 58 has a magnetic pole oppositely charged from the pole of the protrusion adjacent to it. This creates magnetic field lines 60 passing from one protrusion 58 to another along the periphery of sonde 54 and through borehole casing 8. During deployment or repositioning within borehole 4, sensor module 52 is simply dragged along borehole casing 8, with protrusions 58 in magnetic contact therewith.

Coupling of sensor module 52 using permanent magnets 56 provides an interface with the surroundings that does not require external power or controls and is devoid of moving parts. The simple design frees up space and conductive elements on wireline 6 for data transmission, allowing more sensor modules or other equipment to be added to array 2. Movement of sensor module 52 with protrusions 58 in contact with borehole casing 8 also has the added advantage of scraping away possible surface deposits, which will improve magnetic coupling.

Figure 7:
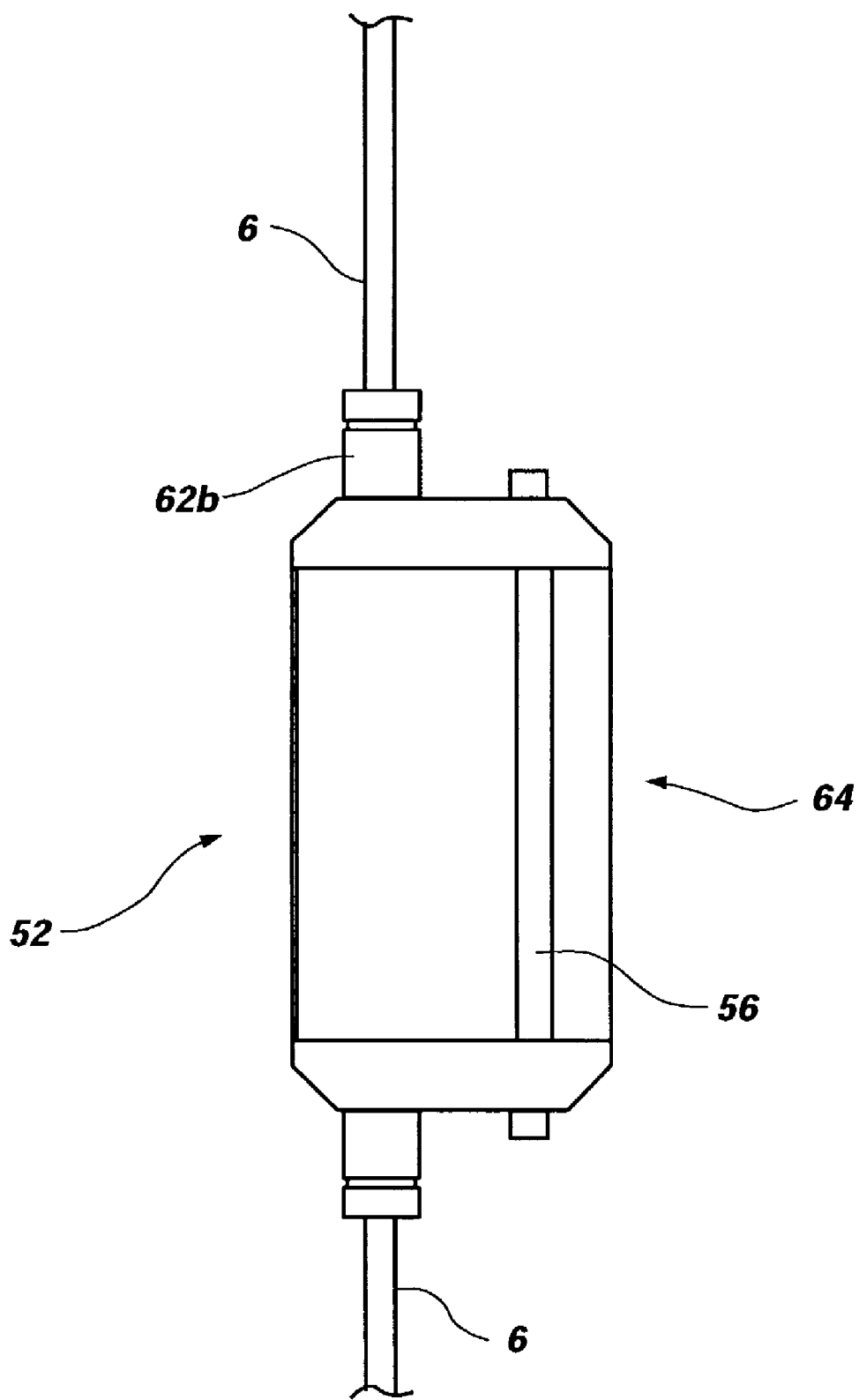
FIG. 7 is a schematic view of an alternative attachment for the sensor module depicted in FIGS. 6A and 6B.

Sensor module 52 may be connected to wireline 6 at a central attachment point 62a such that it is symmetrically balanced, as depicted in FIGS. 6A and 6B. Under this arrangement, sensor module 52 will present attachment surfaces around its perimeter that are uniformly disposed to attachment with borehole casing 8. As seen in FIG. 7, in some instances it may be desirable for sensor module 52 to favor one side for attachment to borehole casing 8. Sensor module 52 is hung from wireline 6 at an off-center attachment point 62b, which will bias it to one side 64. Thus, side 64 will have a predisposition for contact with borehole casing 8. Under this arrangement, magnets 56 may also be limited to the contact area of side 64, rather than being placed around the entire periphery of sonde 54 to further ensure that magnetic coupling to casing 8 will take place on side 64.

Figure 8:
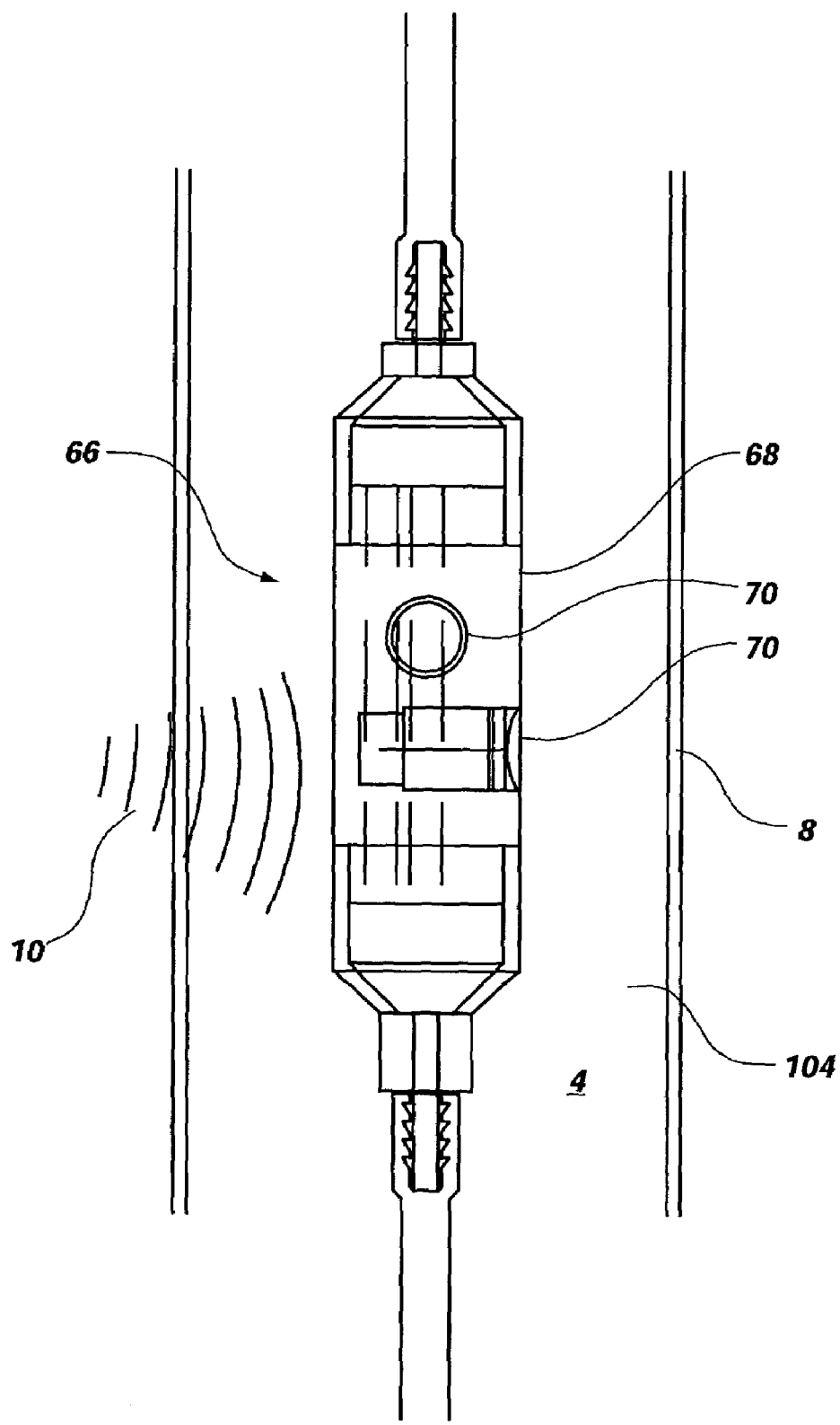
FIG. 8 is a schematic view of a sensor module of the present invention formed as a sonde that does not require direct coupling to a borehole wall or casing.

FIG. 8 schematically illustrates a third exemplary sensor module embodiment 66 of the present invention. Sensor module 66 is fabricated to interface with the surrounding environment within borehole 4 without requiring direct physical coupling to the borehole wall or casing 8. Rather, sensor module 66 uses a liquid type coupling wherein seismic waves 10 are transmitted to the module via the borehole liquid 104. Sensor module 66 comprises a container or sonde 68 for carrying one or more geophone type sensors 70. Sensors 70 as depicted in FIG. 8 are oriented to detect and measure the magnitude of seismic waves in the x and y directions, perpendicular to the longitudinal axis of borehole 4 and, ideally, horizontal in orientation. Sensor module 66 is constructed so that sonde 68 and any sensors 70 contained therein have a combined mass-to-volume ratio with an average density effectively equal to that of the borehole liquid 104. In other words, sensor module 66 will be neutrally buoyant within the borehole liquid. Sonde 68 may comprise, by way of example, a low density solid structure surrounding sensors 70 or may enclose a hollow volume within which sensors 70 are mounted. Sonde 68 therefore presents a surface area that is accelerated at a rate equal to the displacement of borehole liquid 104 responsive to seismic waves 10 transmitted thereto by casing 8 Further, the nearly incompressible nature of a liquid means this displacement will transmit the seismic energy directly to sensor module 66 without any variation in wave propagation.

The response is directional and unmitigated for any frequency of concern. While the borehole liquid 104 is not capable of transmitting a shear wave, the result of solid shear disturbance (in the formation) is an orthogonal compressive wave which may, in turn, be detected. The geophones 70 of sensor module 66 are thereby effectively interfaced with the surrounding environment by "coupling" to borehole 4 via the borehole liquid 104. This eliminates the need for any mechanical coupling devices and provides a highly economical and lightweight unit that is easily supported within the borehole environment. For example, each sensor module 66 may be fabricated for as little as ten percent of the cost of a clamping type sensor module, and the cost of supporting equipment may similarly be significantly reduced. Significantly more potential users exist due to the less extensive equipment requirements of this embodiment, and operational time may be significantly reduced in comparison to clamping type sensor modules as well. Further, it is notable that this embodiment of the invention is operable in an uncased borehole, since there is no need for affixation of the sensor module to casing for seismic coupling.

Figure 9A:
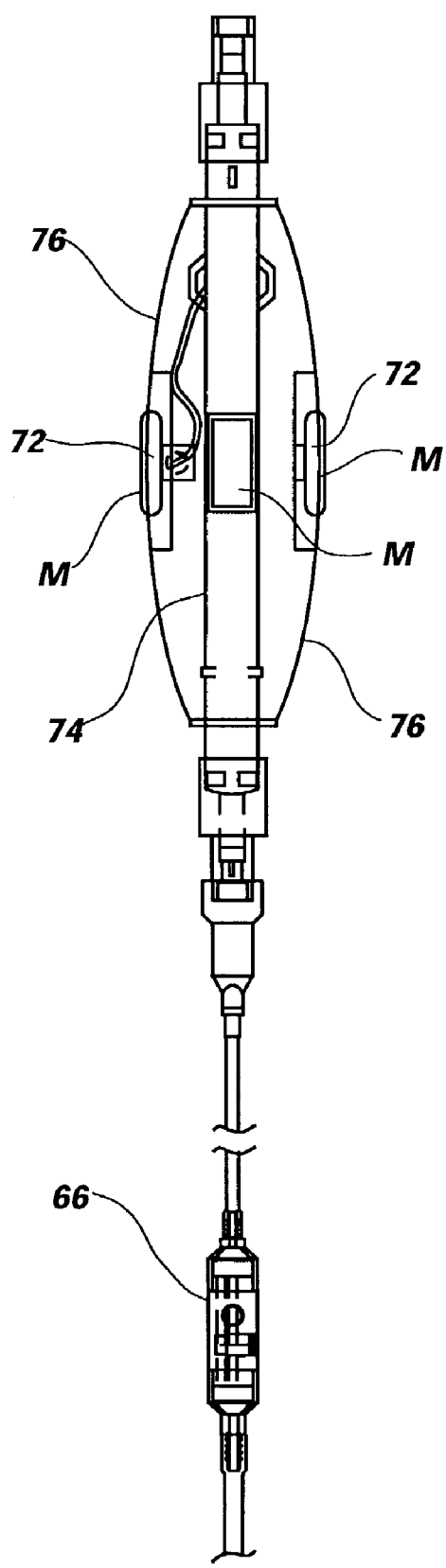
FIGS. 9A and 9B show the sensor module of FIG. 8 including additional physical coupling mechanisms for vertical sensing.
Figure 9B:
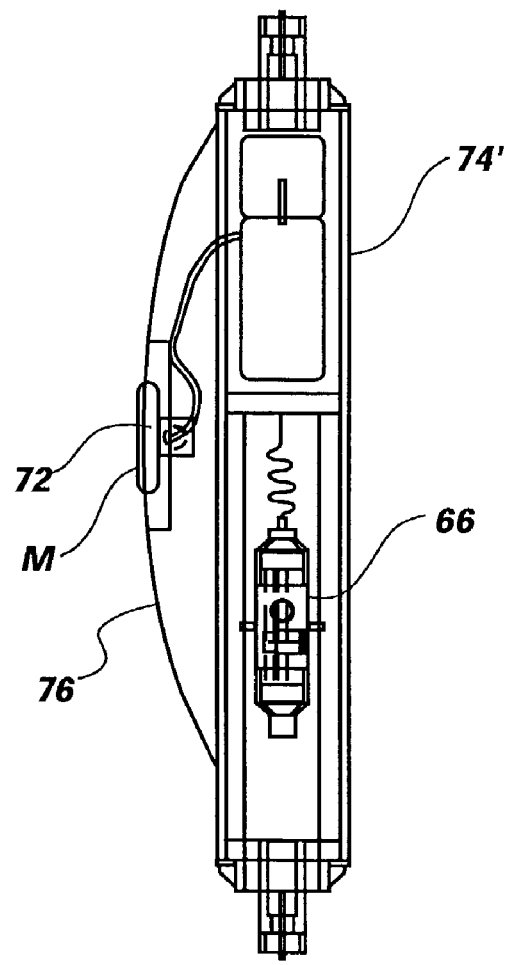

The fluid coupled type sensor module described above works best for translating the x and y, or horizontal orthogonal, seismic wave components to corresponding geophone sensors 70 contained therein, as the impedance mismatch between the solid (formation, cement, casing, etc.) and borehole liquid 104 is small, as is the length of seismic wave travel through the borehole liquid 104. This is due to the fact that while the borehole liquid is nearly incompressible, the z, or vertical seismic wave component, along the longitudinal axis of borehole 4 will travel a much greater distance through the borehole 104 liquid unless the sensor is deployed at the bottom of the borehole 4, and any amount of liquid compressibility will have a cumulative effect. One way to compensate for this problem is to incorporate sensor module 66 into an assembly having an exterior vertical geophone component 72 that is physically coupled to the side of casing 8. FIGS. 9A and 9B show such an assembly wherein a housing 74 with a plurality (for example, four) bow springs 76 circumferentially disposed thereabout holding vertical (z-axis) geophone sensors 72 mounted thereon in physical contact with the side of borehole 4 through magnetic coupling using one or more magnets M. Sensor module 66 is connected to housing 74 so as not to hamper its ability to be displaced by the borehole fluid. FIG. 9A, for example, shows a sensor module 66 suspended below housing 74, while FIG. 9B shows a unitary housing 74' that allows free movement of sensor module 66 suspended within its confines (only one bow spring 76 of a plurality shown for convenience). It is to be understood that other physical coupling means may be used for a Z-axis geophone sensor, the only requirement being that they allow sensor module 66 to be accelerated by the borehole fluid for liquid coupling. It is further contemplated that the bow spring type embodiments of FIGS. 9A and 9B may be used to support and magnetically couple x, y and z-axis geophones to casing, and such a configuration is within the scope of the invention.

While sensor module 66 has been depicted as being deployed on wireline 6 as part of a sensor array, other downhole assemblies may also benefit from the use of fluid coupled type sensors. A borehole, for example, is typically drilled by using a bit that is suspended on a drill string comprising coupled sections of drill pipe extending downwardly into the borehole from the surface. Rotating the drill string at the surface using a rotary table or top drive rotates the bit for drilling when weight is applied to it through the drill string. The drill string may include a bottom hole assembly above the bit including, for example, a downhole motor with a bent housing or other steering element or assembly to enable guided, deviated or directional drilling of the borehole. Further, after an oil or gas well has been successfully drilled and completed, it is necessary over the productive lifetime of the well to perform maintenance or remediation operations within the well borehole. This maintenance or remediation often includes de-scaling operations, or reworking operations such as fracturing or acidization to increase production in older wells. It is quite advantageous to be able to insert equipment into a borehole necessary to perform such maintenance or remediation without removing the surface production equipment at the well head. Coiled tubing, which can be inserted into the borehole through the surface production equipment without removal thereof, has been employed to carry out this function. More recently, coiled tubing has also been used in conjunction with downhole motors for drilling operations as well as other types of borehole operations.

When drilling, it is desirable to know what strata will be drilled through at any time in order to provide appropriate drilling parameters during operation. Features of the strata ahead of the drill may thereby be anticipated, enabling optimized navigation of the borehole through subterranean formations which otherwise might damage the bit or expose the well to dangerous gas overpressure regions. It would, of course, be possible to extract the entire drilling assembly from the borehole and send down a wireline-carried sensor array for surveying, but the time and cost associated with such an approach are very high and safety concerns render this an undesirable alternative. In order to overcome this problem, it is known in the prior art to include seismic sensor arrangements directly within a drilling assembly to examine the area directly surrounding the drill bit concurrently with drilling. An example of this method, often referred to broadly as "measurement while drilling" (MWD) although more accurately termed "seismic while drilling," is disclosed in U.S. Pat. No. 5,798,488 to Beresford et. al., which is incorporated herein by reference. Because rotation of the bit must typically be stopped and circulation of drilling fluid ceased in order to allow seismic measurements without interference from drilling vibrations and fluid turbulence, the fluid coupled sensors of the present invention would be well suited to such an MWD application. By eliminating the need for any mechanical coupling devices, fluid coupled sensors according to the present invention may be activated with minimal pauses in drilling and circulation and may be more easily incorporated into a drilling assembly.

Figure 10A:
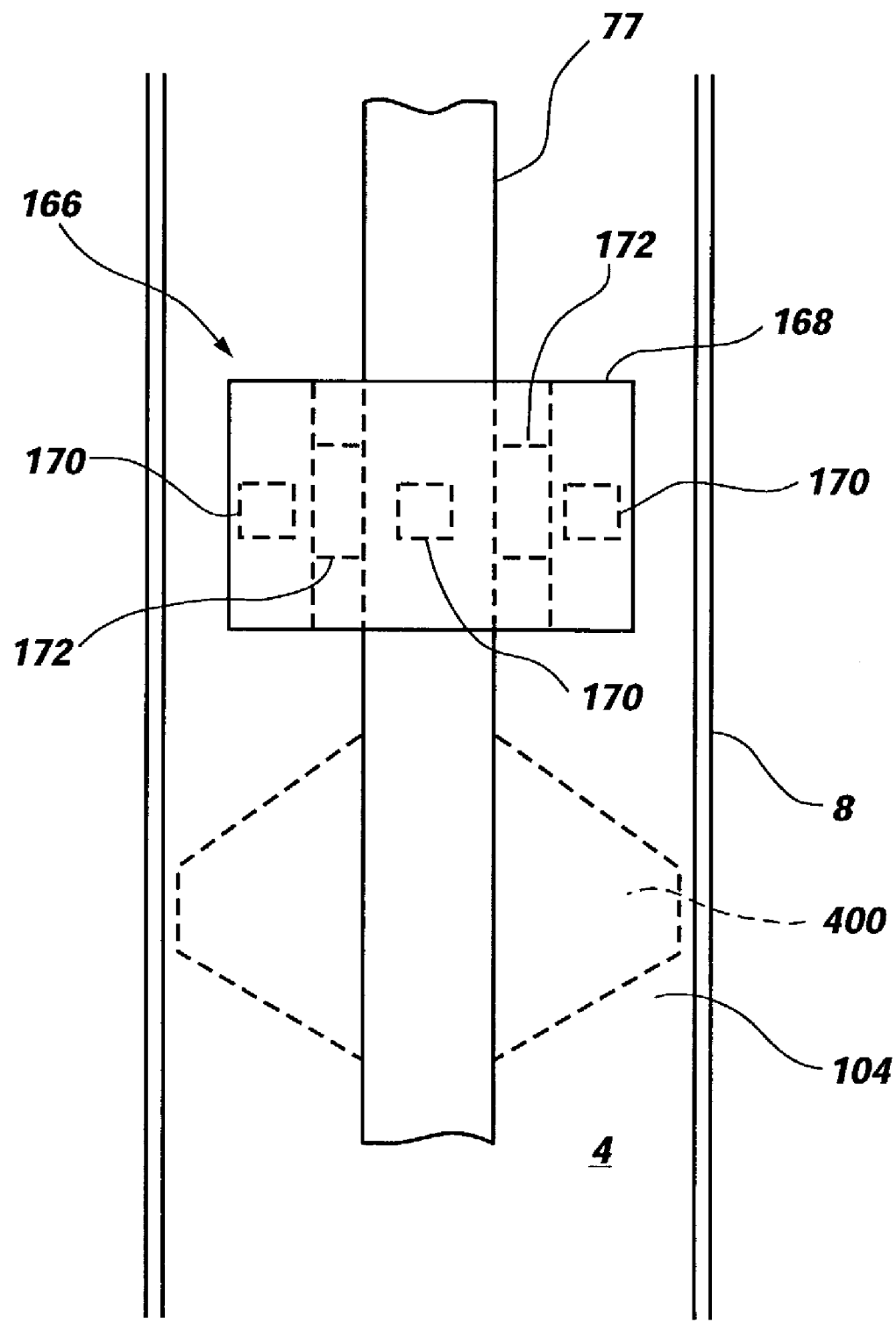
FIGS. 10A and 10B show a sensor module that does not require direct coupling to a borehole wall or casing and that is configured for attachment to a drill pipe or coiled tubing.
Figure 10B:
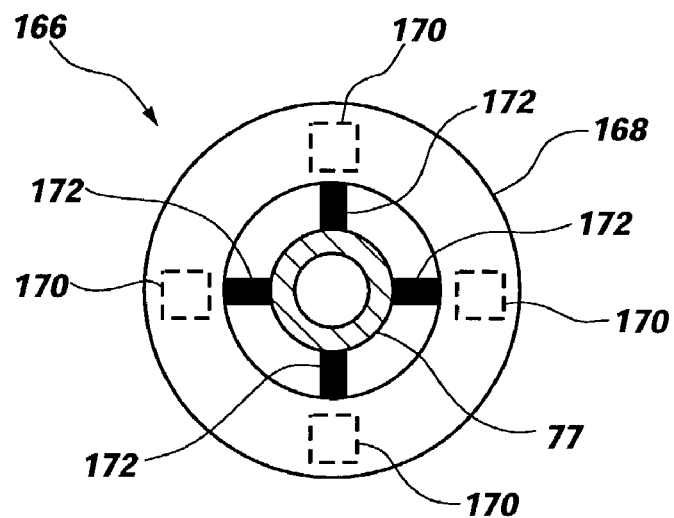

FIGS. 10A and 10B show an embodiment of a fluid coupled type sensor module 166 that is configured for attachment to a drill pipe or coiled tubing 77, which have much greater diameters than a wireline. While sensor module 166 is depicted as disposed within casing 8, sensor module 166 has equal utility for deployment within an uncased borehole for use in conducting seismic operations while drilling. As seen in side view FIG. 10A, sensor module 166 comprises an annular housing 168 carrying one or more geophone type sensors 170. FIG. 10B shows annular housing 168 surrounding drill pipe or coiled tubing 77 and attached thereto with highly resilient mounts 172, allowing housing 168 to move freely in the x and y orthogonal directions. Mounts 172 may be formed, for instance, of low modulus rubber, springs or any other material having sufficient elasticity to allow housing 168 to move in the x and y directions without substantial resistance. Furthermore, while FIG. 10B shows four mounts 172 for supporting housing 168, any number of mounts could be used, or the mounting structure could even be formed as a unitary ring entirely surrounding drill pipe or coiled tubing 77. Such an approach may facilitate damping of seismic waves in the z direction along the axis of the borehole. As with sensor module 66, sensor module 166 and sensors 170 contained therein have a combined mass-to-volume ratio with an average density effectively equal to that of the borehole liquid 104 so that sensor module 166 and sensors 170 are essentially neutrally buoyant. The geophones 170 of sensor module 166 are thereby interfaced with the surrounding environment by the movement of annular housing 168.

If sensor module 166 is deployed on drill pipe 77 in a drilling operation it may be desirable to employ concentric stabilizers 400 (FIG. 10A) intermittently along drill pipe 77 to prevent contact of sensor module 166 with the wall of the borehole. Centralization of the structure (drill pipe or coiled tubing) carrying sensor module 166 should always be considered if the borehole segment in which sensor module 166 is deployed is off-vertical by any significant amount. Of course, sensor module 166 may be placed along a necked-down or reduced diameter central portion of drill pipe 77 between the diametrically enlarged male (pin) and female (box) ends, which function to centralize the drill pipe and maintain sensor module 166 out of contact with the borehole.

Figure 11:
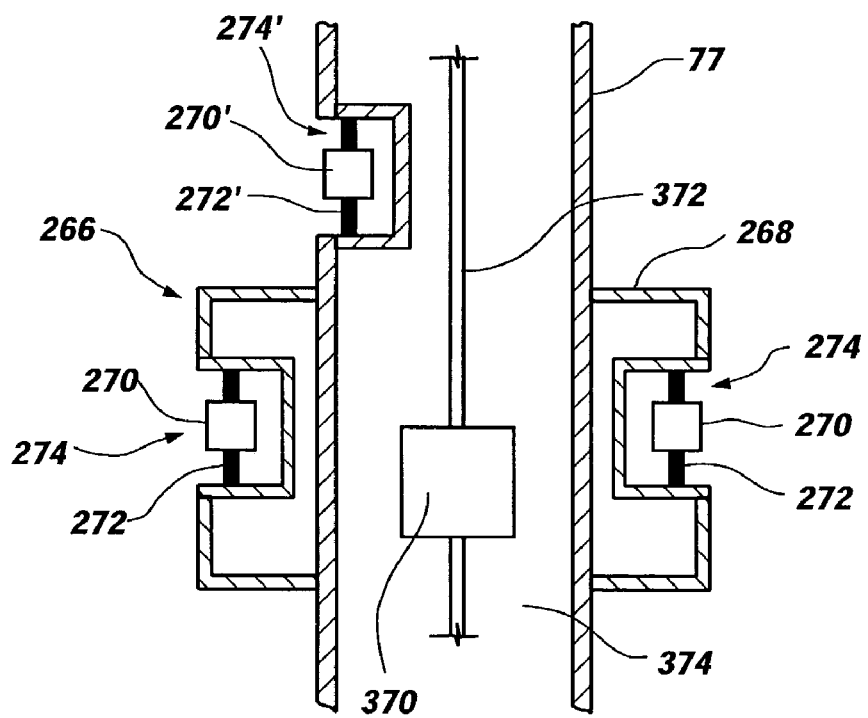
FIG. 11 shows alternative embodiments to the sensor module depicted in FIGS. 10A and 10B.

FIG. 11 shows a sectional side view of an alternative to the above fluid coupled structure, wherein a sensor module 266 is fixedly mounted to drill pipe or coiled tubing 77. In this embodiment, geophone sensors 270 are not interfaced with the environment by movement of housing 268, but are instead movably mounted within recesses 274 by resilient mounts 272 for direct interface with borehole liquid 104. As seismic waves pass through borehole liquid 104 in the x and y orthogonal directions, sensors 270 move within recesses 274 to monitor their transmission. Housing 268 may comprise an annular housing with recesses in its surface, or may simply comprise shielding structures extending from drill pipe 77 to at least partially surround sensors 270. It is also contemplated that housing 268 may be completely omitted, and sensors 270' would be movably mounted on resilient mounts 272' in recesses 274' formed directly in a specially configured drill pipe 77. While these fluid coupled embodiments are depicted and described as including a annular ring type housing, it will be understood by those of ordinary skill in the art that other housing configurations will be possible, and that any number of geophone sensors may be positioned in various locations about and along drill pipe or coiled tubing 77.

When sensors 170, 270 are deployed on drill pipe or coiled tubing 77 in a borehole that has been drilled in a direction that is not substantially vertical, sensors 170, 270 will offset from the x and y orthogonal axis. It is necessary to mathematically compensate for this offset, which compensations are within the ability of those of ordinary skill in the art and so will not be described in further detail herein.

It is also contemplated that an array of sensors 370 may be deployed on a conductive cable completely within coiled tubing 77 as shown in FIG. 11 as yet another implementation of the present invention. In such an instance, the material of coiled tubing 77 would be selected to "give," or respond to, an encounter with a seismic signal to convey the same to sensors 370 disposed in a surrounding fluid 374 within coiled tubing 77 for substantially neutral buoyancy and effective signal transmission.

In a further embodiment of the present invention, a number of sensor modules of the various different above-described embodiments are provided for deployment within a borehole on a single sensor array. Going back to FIG. 1, sensor array 2 includes sensor modules 14, 52 and 66 instead of only one module type or embodiment, as would be the case in prior art arrays. The sensor signals for the separate x, y and z orthogonal seismic wave components from each sensor module are output to a processor 78. The signals for wave components most effectively measured by each of the sensor module embodiments are then used to generate a seismic survey, while the other component signals are filtered out. For example, the vertical wave component signal from the liquid coupled module 66 might be filtered out, while one or more horizontal components of modules 14 and 52 are eliminated, depending on signal strength and correlation between the sensor outputs. This approach optimizes the integrity of survey data by combining the advantages of each sensing technique into a single, composite output. The sensor module composition of array 2 in FIG. 1 is only for purposes of illustration and not by way of any limitation of the present invention. Any number of modules in any order on wireline 6 may be used. Moreover, only two sensor module embodiments might be deployed, instead of the three shown in FIG. 1. It is further noted that all of the embodiments of the present invention, due to their simplicity, may enable the use of arrays of dozens or even hundreds of sensor modules due to their light weight and simplicity of operation, as wireline transmission capacity may be used for data rather than power and control functions.

It is also contemplated that the sensor modules of the present invention may be fabricated in multiple segments, wherein the geophone sensors and associated signal amplification/transmission components are housed separately. This approach reduces the sensor module mass for the geophone containing segment and thus increases the effectiveness of the magnetic coupling force securing the geophone to the casing wall or, in the case of the liquid coupling embodiment, the sensor module displacement response. Although the present invention has been described with respect to the illustrated embodiments, various additions, deletions and modifications are contemplated without departing from its scope or essential characteristics. Furthermore, while described in the context of oil and gas exploration, the invention has utility in all types of subterranean geological exploration. The scope of the invention is, therefore, indicated by the appended claims rather than the foregoing description. All changes that come within the meaning and range of equivalency of the claims are to be embraced within their scope.

What is claimed is:

1. A sensor module for monitoring seismic waves in a borehole, comprising:
   a sensor module housing;
   a plurality of rotatable bogey wheels mounted to the sensor module housing for supporting the sensor module housing during longitudinal movement thereof within a borehole;
   a sensor package including at least one permanent magnet; and
   a mechanism configured for extending and retracting the sensor package relative to the sensor module housing responsive to rotation of at least one of the bogey wheels.

2. The sensor module of claim 1, wherein at least one of the bogey wheels is biased to swing outwardly from the sensor module housing.

3. The sensor module of claim 1, wherein the mechanism is configured to retract the sensor package automatically responsive to rotation of the bogey wheels.

4. The sensor module of claim 3, wherein the mechanism is further configured to extend the sensor package automatically when the bogey wheels are not rotating.

5. The sensor module of claim 3, wherein the mechanism is further configured to extend the sensor package automatically responsive to a reversal of rotation of the bogey wheels.

6. The sensor module of claim 1, wherein the mechanism comprises:
   a hydraulically actuated device; and
   a hydraulic pump actuated by the rotation of the at least one bogey wheel and operably coupled to extend the hydraulically actuated device.

7. The sensor module of claim 6, wherein the mechanism further comprises:
   a cable attached at a first end to the hydraulically actuated device and at a second end to the sensor package, wherein the cable is configured to retract the sensor package upon extension of the hydraulically actuated device.

8. The sensor module of claim 6, wherein the hydraulic pump is a hydraulic gear pump, at least a portion of which is incorporated within the at least one bogey wheel.

9. The sensor module of claim 1, wherein the mechanism comprises:
   a cam member supporting the sensor package; and
   at least one friction clutch connecting the cam member to at least one of the bogey wheels.

10. The sensor module of claim 9, wherein the cam member is configured to retract the sensor module automatically responsive to rotation of the at least one bogey wheel.

11. The sensor module of claim 10, wherein the cam member is further configured to extend the sensor module automatically responsive to a reversal in direction of rotation of the at least one bogey wheel.

12. The sensor module of claim 1, wherein the sensor package further comprises a geophone sensor.

13. The sensor module of claim 12, wherein the sensor package is rotatably supported by a at least one linkage.

14. The sensor module of claim 12, wherein the sensor package is supported by a pair of staggered pins.

* * * * *